United States Patent
Sathish et al.

(10) Patent No.: US 8,380,810 B2
(45) Date of Patent: Feb. 19, 2013

(54) METHOD AND APPARATUS PROVIDING FOR OUTPUT OF A CONTENT PACKAGE BASED AT LEAST IN PART ON A CONTENT CATEGORY SELECTION AND ONE OR MORE CONTEXTUAL CHARACTERISTICS

(75) Inventors: Sailesh Kumar Sathish, Tampere (FI); Arto Juhani Lehtiniemi, Lempäälä (FI)

(73) Assignee: Nokia Corporation, Espoo (FI)

( * ) Notice: Subject to any disclaimer, the term of this patent is extended or adjusted under 35 U.S.C. 154(b) by 105 days.

(21) Appl. No.: 12/724,760

(22) Filed: Mar. 16, 2010

(65) Prior Publication Data

US 2011/0231512 A1    Sep. 22, 2011

(51) Int. Cl.
*G06F 15/16* (2006.01)

(52) U.S. Cl. .................................... 709/217; 709/220

(58) Field of Classification Search .......... 709/200–203, 709/217–227, 228
See application file for complete search history.

(56) References Cited

U.S. PATENT DOCUMENTS

| | | | |
|---|---|---|---|
| 6,487,538 B1 | 11/2002 | Gupta et al. | |
| 6,912,398 B1 | 6/2005 | Domnitz | |
| 7,073,129 B1 | 7/2006 | Robarts et al. | |
| 7,116,985 B2 * | 10/2006 | Wilson et al. | 455/456.1 |
| 7,285,090 B2 | 10/2007 | Stivoric et al. | |
| 7,343,564 B2 * | 3/2008 | Othmer | 715/774 |
| 7,532,900 B2 * | 5/2009 | Wilson et al. | 455/456.3 |
| 7,587,484 B1 | 9/2009 | Smith et al. | |
| 7,593,921 B2 * | 9/2009 | Goronzy et al. | 1/1 |
| 2001/0049826 A1 | 12/2001 | Wilf | |
| 2002/0160766 A1 | 10/2002 | Portman et al. | |
| 2003/0059091 A1 * | 3/2003 | Kambe et al. | 382/113 |
| 2003/0135488 A1 | 7/2003 | Amir et al. | |
| 2005/0120369 A1 | 6/2005 | Matz | |
| 2006/0136393 A1 | 6/2006 | Abbott et al. | |
| 2007/0100666 A1 | 5/2007 | Stivoric et al. | |
| 2007/0266305 A1 | 11/2007 | Cong et al. | |

(Continued)

FOREIGN PATENT DOCUMENTS

| | | |
|---|---|---|
| EP | 2 043 087 A1 | 4/2009 |
| WO | WO 00/04730 A1 | 1/2000 |

(Continued)

OTHER PUBLICATIONS

Search Report and Written Opinion for International Application No. PCT/IB2011/051090, mailed Jun. 27, 2011.

(Continued)

*Primary Examiner* — Moustafa M Meky
(74) *Attorney, Agent, or Firm* — Alston & Bird LLP (57) ABSTRACT

An apparatus providing for output of a content package may include a content category selector for receiving a content category selection. A content category extractor may extract the content category selection from a content feed. The apparatus may further comprise a contextual characteristic determiner for determining one or more contextual characteristics. A GPS module may determine a location of the apparatus. The apparatus may thereby provide for selection of a content package based at least in part on the content category selection and the one or more contextual characteristics. The actual selection of the content package may occur in an external device, such as a content category selector. Once the content package is selected, the apparatus may provide for output of the content package such as through displaying the content package on a display.

17 Claims, 6 Drawing Sheets

U.S. PATENT DOCUMENTS

| | | |
|---|---|---|
| 2008/0000964 A1 | 1/2008 | Flake et al. |
| 2008/0065774 A1 | 3/2008 | Keeler |
| 2008/0127232 A1 | 5/2008 | Langen et al. |
| 2008/0302867 A1 | 12/2008 | Holberg |
| 2009/0024559 A1 | 1/2009 | Arrasvuori |
| 2009/0055426 A1 | 2/2009 | Kalasapur et al. |
| 2009/0070209 A1 | 3/2009 | Von Wolfsheild |
| 2009/0100037 A1 | 4/2009 | Scheibe |
| 2009/0131025 A1 | 5/2009 | Sharma et al. |
| 2009/0157512 A1 | 6/2009 | King |
| 2009/0204706 A1 | 8/2009 | Ertugrul et al. |
| 2009/0234909 A1 | 9/2009 | Strandell et al. |
| 2009/0248602 A1* | 10/2009 | Frazier ............ 706/46 |
| 2010/0004004 A1* | 1/2010 | Browne-Swinburne et al. ............ 455/457 |
| 2010/0030465 A1* | 2/2010 | Solkesz et al. ............ 701/201 |
| 2010/0082398 A1 | 4/2010 | Davis et al. |
| 2010/0082650 A1 | 4/2010 | Wong |
| 2010/0087207 A1 | 4/2010 | Tsurutome et al. |
| 2010/0087230 A1* | 4/2010 | Peh et al. ............ 455/566 |
| 2010/0121936 A1 | 5/2010 | Liu et al. |
| 2010/0205541 A1 | 8/2010 | Rapaport et al. |
| 2011/0130956 A1 | 6/2011 | Tracton et al. |
| 2011/0295606 A1 | 12/2011 | Ben-Ezri |
| 2011/0321072 A1 | 12/2011 | Patterson et al. |

FOREIGN PATENT DOCUMENTS

| | | |
|---|---|---|
| WO | WO 02/23304 A2 | 3/2002 |
| WO | WO 2008/024706 A2 | 2/2008 |
| WO | WO 2008/082794 A2 | 7/2008 |

OTHER PUBLICATIONS

Search Report and Written Opinion for International Application No. PCT/IB2011/051759, mailed Jul. 20, 2011.
Search Report and Written Opinion for International Application No. PCT/IB2011/051180, mailed Jun. 1, 2011.
International Search Report and Written Opinion for Application No. PCT/IB2011/054370 dated Mar. 13, 2012.
International Search Report and Written Opinion for Application No. PCT/IB2011/054604 dated Mar. 14, 2012.
International Search Report and Written Opinion for Internaitonal Application No. PCT/IB2011/052525, mailed Nov. 9, 2011.

* cited by examiner

METHOD AND APPARATUS PROVIDING FOR OUTPUT OF A CONTENT PACKAGE BASED AT LEAST IN PART ON A CONTENT CATEGORY SELECTION AND ONE OR MORE CONTEXTUAL CHARACTERISTICS

TECHNOLOGICAL FIELD

Embodiments of the present invention relate generally to outputting content, such as by displaying the content and, more particularly, relate to an apparatus, method and a computer program product providing for output of a content package based at least in part on a content category selection and one or more contextual characteristics.

BACKGROUND

In order to provide easier or faster information transfer and convenience, telecommunication industry service providers are continually developing improvements to existing communication networks. As a result, wireless communication has become increasingly more reliable in recent years. Along with the expansion and improvement of wireless communication networks, mobile terminals used for wireless communication have also been continually improving. In this regard, due at least in part to reductions in size and cost, along with improvements in battery life and computing capacity, mobile terminals have become more capable, easier to use, and cheaper to obtain. Due to the now ubiquitous nature of mobile terminals, people of all ages and education levels are utilizing mobile terminals to communicate with other individuals or contacts, receive services and/or share information, media and other content.

One of the technologies which is becoming more popular is that of location based services. In this regard, some technologies may provide users of properly equipped mobile terminals with content which is specific to the present location of the user, or other contextual information. Thus, for example, the user may be provided with weather information relating to the user's present location. In some cases the content may be displayed on the home screen of the device. In other instances the user may be provided with information such as Uniform Resource Locators (URLs) which relate to one or both of the user's interests and the user's present location. Thus, content may be provided to the user automatically. However, other than possibly guessing based off of the user's present location, it may be difficult to determine the specific interests of the user at any given time.

Accordingly it may be desirable to provide an improved method and apparatus providing for output of a content package.

BRIEF SUMMARY OF THE INVENTION

A method, apparatus and computer program product are therefore provided that may provide for output of a content package in a content category of interest to the user. The content package, which may, for example, comprise a list of URL links or other content such as pictures, data, audio, or video, may be chosen based at least in part on a content category selection and on one or more relevant contextual characteristics.

In an example embodiment, an improved apparatus comprises at least one processor and at least one memory including computer program code, the at least one memory and the computer program code configured to, with the processor, cause the apparatus to at least perform receiving a content category selection, determining one or more contextual characteristics, providing the content category selection and the one or more contextual characteristics to permit selection of a content package, and providing for output of the content package.

The apparatus may also be configured to perform updating the content package based on a change to the content category selection or the one or more contextual characteristics. Further, receiving the content category selection may comprise extracting the content category selection from a content feed, combining a plurality of user profiles, and/or receiving a user mood indicator. Additionally, providing the content category selection and the one or more contextual characteristics may comprise providing for transmission of a content request comprising the content category selection and the one or more contextual characteristics to a content package selector, and receiving the content package from the content package selector. Providing the content category selection and the one or more contextual characteristics may additionally or alternatively comprise applying a predefined rule to the content category selection and the one or more contextual characteristics.

In an additional example embodiment a method comprises receiving a content category selection, determining one or more contextual characteristics, providing the content category selection and the one or more contextual characteristics to permit selection of a content package, and providing for output of the content package.

In some embodiments the method may also comprise updating the content package based on a change to the content category selection or the one or more contextual characteristics. Further, in some embodiments receiving the content category selection may comprise extracting the content category selection from a content feed, and/or combining a plurality of user profiles, and/or receiving a user mood indicator. Additionally, providing the content category selection and the one or more contextual characteristics may comprise providing for transmission of a content request comprising the content category selection and the one or more contextual characteristics to a content package selector, and receiving the content package from the content package selector. Providing the content category selection and the one or more contextual characteristics may additionally or alternatively comprise applying a predefined rule to the content category selection and the one or more contextual characteristics.

In a further example embodiment a computer program product comprises at least one computer-readable storage medium having computer-executable program code portions stored therein, the computer-executable program code portions comprising program code instructions for receiving a content category selection, program code instructions for determining one or more contextual characteristics, program code instructions providing the content category selection and the one or more contextual characteristics to permit selection of a content package, and program code instructions providing for output of the content package.

In some embodiments the computer program product may further comprise program code instructions for updating the content package based on a change to the content category selection or the one or more contextual characteristics. Further, in some embodiments program code instructions for receiving the content category selection may comprise program code instructions for extracting the content category selection from a content feed, program code instructions for combining a plurality of user profiles, and/or program code instructions for receiving a user mood indicator. Additionally, program code instructions providing the content category selection and the one or more contextual characteristics may comprise program code instructions providing for transmission of a content request comprising the content category selection and the one or more contextual characteristics to a content package selector, and program code instructions for receiving the content package from the content package selector. Program code instructions providing the content category selection and the one or more contextual characteristics may additionally or alternatively comprise program code instructions for applying a predefined rule to the content category selection and the one or more contextual characteristics.

Accordingly, embodiments of the present invention may provide for improved outputting of a content package based at least in part on a content category selection and one or more contextual characteristics.

BRIEF DESCRIPTION OF THE SEVERAL VIEWS OF THE DRAWING(S)

Having thus described embodiments of the present disclosure in general terms, reference will now be made to the accompanying drawings, which are not necessarily drawn to scale, and wherein:

DETAILED DESCRIPTION OF THE INVENTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

As used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
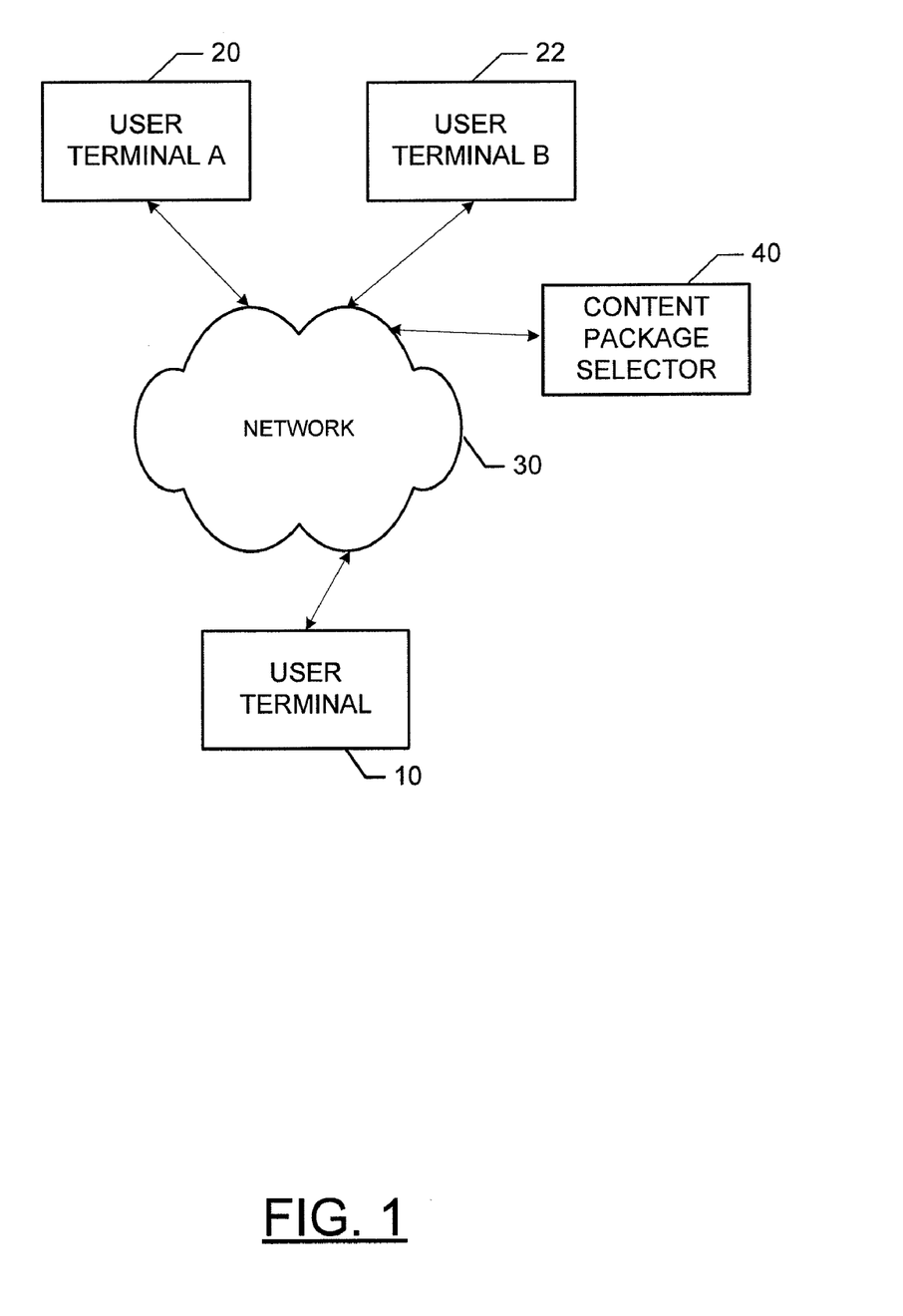
FIG. 1 illustrates a schematic block diagram of a system according to an example embodiment of the present invention.

As indicated above, embodiments of the present invention may be employed in methods, apparatuses and computer program products providing for output of a content package. In this regard, for example, FIG. 1 illustrates a block diagram of a system that may benefit from embodiments of the present invention. It should be understood, however, that the system as illustrated and hereinafter described is merely illustrative of one system that may benefit from embodiments of the present invention and, therefore, should not be taken to limit the scope of embodiments of the present invention.

As shown in FIG. 1, an embodiment of a system in accordance with an example embodiment of the present invention may include a user terminal 10. The user terminal 10 may be any of multiple types of fixed or mobile communication and/or computing devices such as, for example, portable digital assistants (PDAs), pagers, mobile televisions, mobile telephones, gaming devices, laptop computers, personal computers (PCs), cameras, camera phones, video recorders, audio/video players, radios, global positioning system (GPS) devices, or any combination of the aforementioned, and other types of voice and text communications systems, which employ embodiments of the present invention.

The user terminal 10 may be configured to output a content package, such as a list of URL links or other content such as pictures, data, audio, or video. In some embodiments the user terminal 10 may be capable of communicating with one or more additional user terminals such as user terminal A 20 and user terminal B 22. Communication between the user terminal 10 and user terminal A 20 and or user terminal B 22 may in some embodiments occur, either directly, or via a network 30. The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Thus, the network 30 may be a cellular network, a mobile network and/or a data network, such as a local area network (LAN), a metropolitan area network (MAN), and/or a wide area network (WAN), for example, the Internet. In turn, other devices such as processing elements (for example, personal computers, server computers or the like) may be included in or coupled to the network 30. By directly or indirectly connecting the user terminal 10 and the other devices to the network 30, the user terminal 10 and/or the other devices may be enabled to communicate with each other, for example, according to numerous communication protocols including Hypertext Transfer Protocol (HTTP) and/or the like, to thereby carry out various communication or other functions of the mobile terminal 10 and the other devices, respectively. As such, the user terminal 10 and the other devices may be enabled to communicate with the network 30 and/or each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as wireless LAN (WLAN), Worldwide Interoperability for Microwave Access (WiMAX), WiFi, ultra-wide band (UWB), Wibree techniques and/or the like and fixed access mechanisms such as digital subscriber line (DSL), cable modems, Ethernet and/or the like. Thus, for example, the network 30 may be a home network or other network providing local connectivity.

The system may further comprise a content package selector 40 which may be in communication with the user terminal 10 and user terminal A 20 and/or user terminal B 22 either directly, or through the network 30. As will be described in detail below, the content package selector 40 may be configured to select a content package and transmit it to the user terminal 10. Specifically, the content package selector 40 may be configured to receive a content category selection and one or more contextual characteristics from the user terminal 10, for example by way of an Extensible Markup Language (XML) content request, and select a content package for the user terminal based at least in part on the content category selection and the one or more contextual characteristics. The content package selector 40 may for example be a server, server bank or other computer or other computing device or node configured to select a content package. The content package selector 40 may have any number of functions or associations with various services. As such, for example, the content package selector 40 may be a platform such as a dedicated server (or server bank), or the content package selector may be a backend server associated with one or more other functions or services. Thus, the content package selector 40 may potentially select a variety of different content packages. In some embodiments the content package selector 40 may select and distribute commercial and/or non-commercial content. Accordingly, the operations performed by the content package selector 40 may or may not comprise processing payment in exchange for distributing the content. In some embodiments payment may be processed by a separate device. Further, although the content package selector 40 is herein generally described as a server, in some embodiments the content package selector may be embodied as a portion of the user terminal 10, such an internal module therein.

In an example embodiment, an apparatus 50 is provided that may be employed by devices performing example embodiments of the present invention. The apparatus 50 may be embodied, for example, as any device hosting, including, controlling or otherwise comprising the user terminal 10. However, embodiments may also be embodied on a plurality of other devices such as for example where instances of the apparatus 50 may be embodied on the network 30 and/or the content package selector 40. As such, the apparatus 50 of FIG. 2 is merely an example and may include more, or in some cases less, than the components shown in FIGS. 2.

Figure 2:
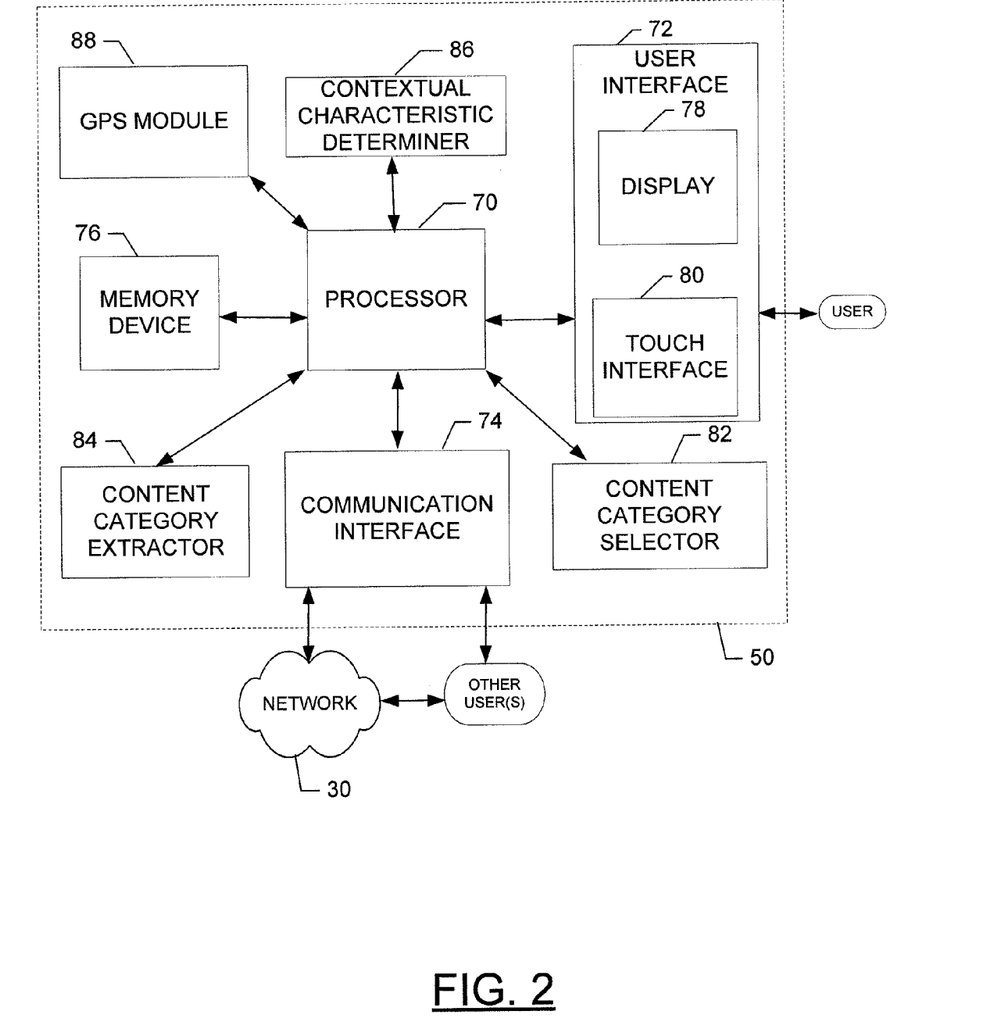
FIG. 2 illustrates a schematic block diagram of an apparatus providing for output of a content package according to an example embodiment of the present invention.

With further regard to FIG. 2, the apparatus 50 is configured to output a content package, such as by displaying a content package selected by the content package selector 40 based at least in part on a content category selection and one or more contextual characteristics. The apparatus 50 may include or otherwise be in communication with a processor 70, a user interface 72, a communication interface 74 and a memory device 76. The memory device 76 may include, for example, volatile and/or non-volatile memory. The user interface 72 may comprise a display 78 and a touch interface 80, which collectively define a touch screen 78/80. The memory device 76 may be configured to store information, data, files, applications, instructions or the like. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases or storage locations that store information and/or media content.

The processor 70 may be embodied in a number of different ways. For example, the processor 70 may be embodied as one or more of various processing means such as a coprocessor, a microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a hardware accelerator, a special-purpose computer chip, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (for example, physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (for example, a mobile terminal or network device such as a server) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 74 may include hardware and/or software for supporting communication mechanisms such as BLUETOOTH®, Infrared, UWB, WiFi, and/or the like, which are being increasingly employed in connection with providing home connectivity solutions.

The user interface 72 may be in communication with the processor 70 to receive an indication of a user input at the user interface and/or to provide an audible, visual, mechanical or other output to the user. As such, the user interface 72 may include, for example, a keyboard, a mouse, a joystick, a display, a touch screen, a microphone, a speaker, or other input/output mechanisms.

In some embodiments the apparatus 50 may include a content category selector 82. The processor 70 may be embodied as, include or otherwise control the content category selector 82. The content category selector 82 may employ or embody logic which receives a content category selection, such as from a user through the touch screen 78/80. For example, the apparatus 50 may be configured to provide the user with a plurality of options for selecting content categories from which the user may select. Content categories, as used herein, generally refer to any grouping of information, data, or other content. Thus, by way of example, content categories may include news, weather, sports, hobbies, etc. of varying levels of specificity. Thus, content categories in some embodiments may be selected for any topic at any level of specificity or generality.

Figure 3:
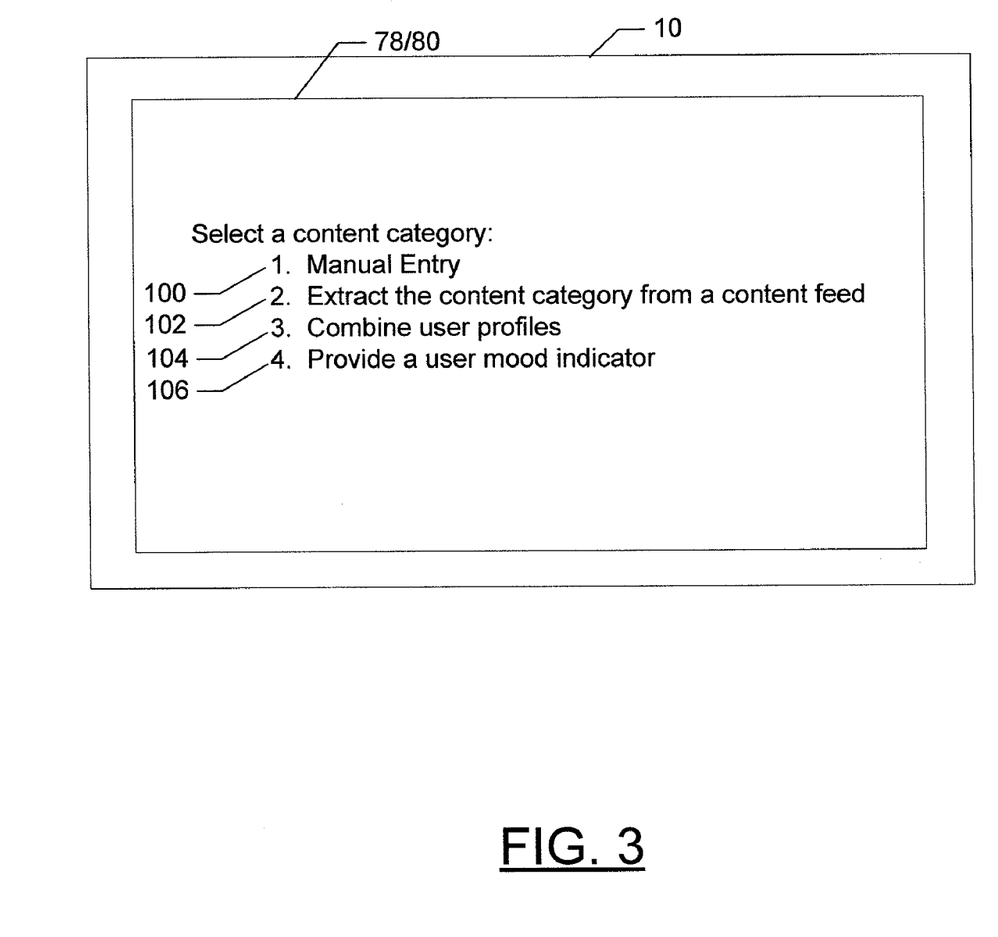
FIG. 3 illustrates an embodiment of a user terminal which is being used to receive a content category selection according to an example embodiment of the present invention.

In one embodiment illustrated in FIG. 3, the content category selector 82 may provide the user with the option to select manual entry 100 of the content category, extract the content category from a content feed 102, combine user profiles 104, or provide a user mood indicator 106, although various other options may be provided. With regards to the option 100 of manual entry, this option may allow the user to manually enter a content category of interest. However, the user may also be provided with a list of previous content categories that the user has selected and/or a list of general interest content categories which the user has associated with his user profile. In some embodiments content categories may include, for example, arts, crafts, restaurants, computers, etc. In terms of the option 102 of extracting the content category from a content feed, this may involve, for example, monitoring a specified person's account on one or more social networks. For example, if the user chooses to follow the messages posted by a user who posts a message indicating that he will be going to lunch in a certain location, a content category extractor 84 of the apparatus 50 may select a content category relating to restaurants in the specified location. The content category extractor 84 may in some embodiments comprise a portion of the content category selector 82, or in other embodiments the content category extractor may comprise a separate module, as illustrated in FIG. 2. Thus, the processor 70 may be embodied as, include or otherwise control the content category extractor 84.

Figure 4:
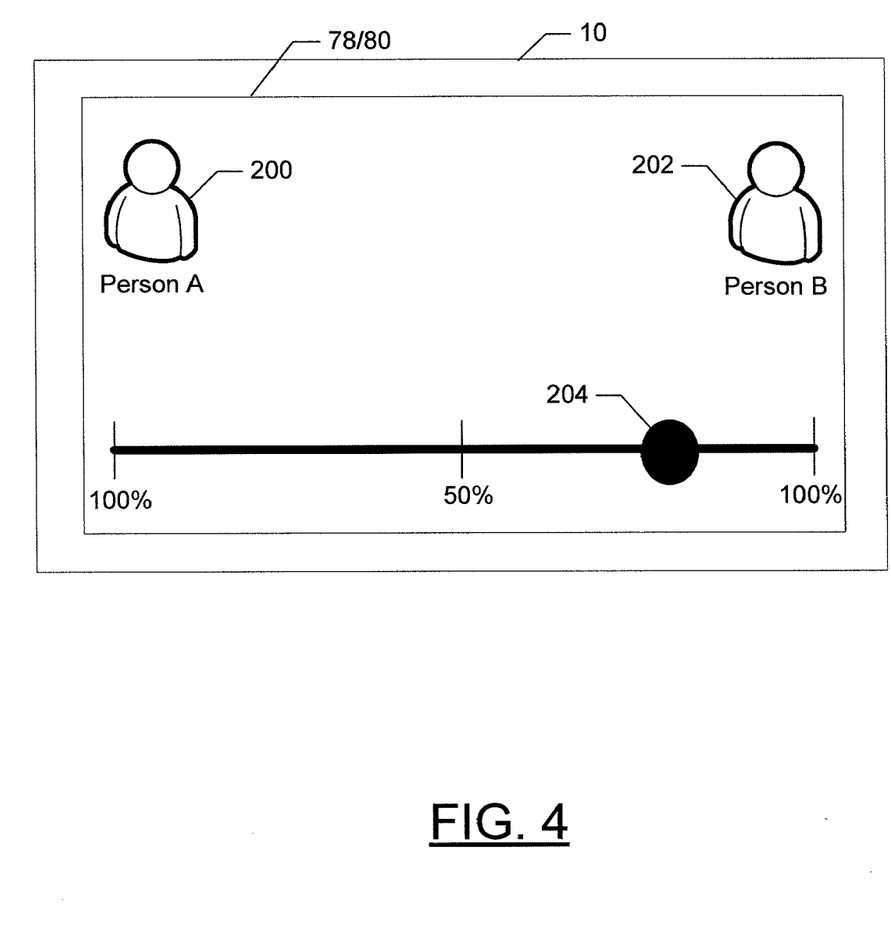
FIG. 4 illustrates the user terminal of FIG. 3 which is being used to combine a plurality of user profiles according to an example embodiment of the present invention.

With regard to the option 104 of combining multiple user profiles, one embodiment is illustrated in FIG. 4. In this embodiment the content category selector 82 may provide the user with the option of combining a plurality of user profiles by either combining external user profiles, or by combining the user's profile with one or more external user profiles. In the illustrated example, the user has chosen to combine the user profiles from person A 200 and person B 202, which may, for example, be associated with user terminal A 20 and user terminal B 22 from FIG. 1. The user terminal 10, when it embodies the apparatus 50 and thereby the content category selector 82, may allow the user to combine the respective user profiles of person A 200 and person B 202. For example, the user may be able to adjust a sliding scale 204 between different combinations wherein only one of the two persons' user profiles is considered, they are equally considered, or anywhere in between, such as by using the touch screen 78/80. Thus, when the sliding scale 204 is adjusted to the illustrated position, person B's user profile would be weighted more heavily than person A's user profile. Once the user makes this selection, the content category selector 82 may thereby select the content category based on the user selection. For instance, the content category selector 82 may select a content category which is more related to skiing than cooking if person B's user profile indicated an interest in skiing and person A's profile indicated an interest in cooking. However, the content category selection may be inputted in various other ways, such as, for example, directly typing in the weighted percentage assigned to each user profile.

Figure 5:
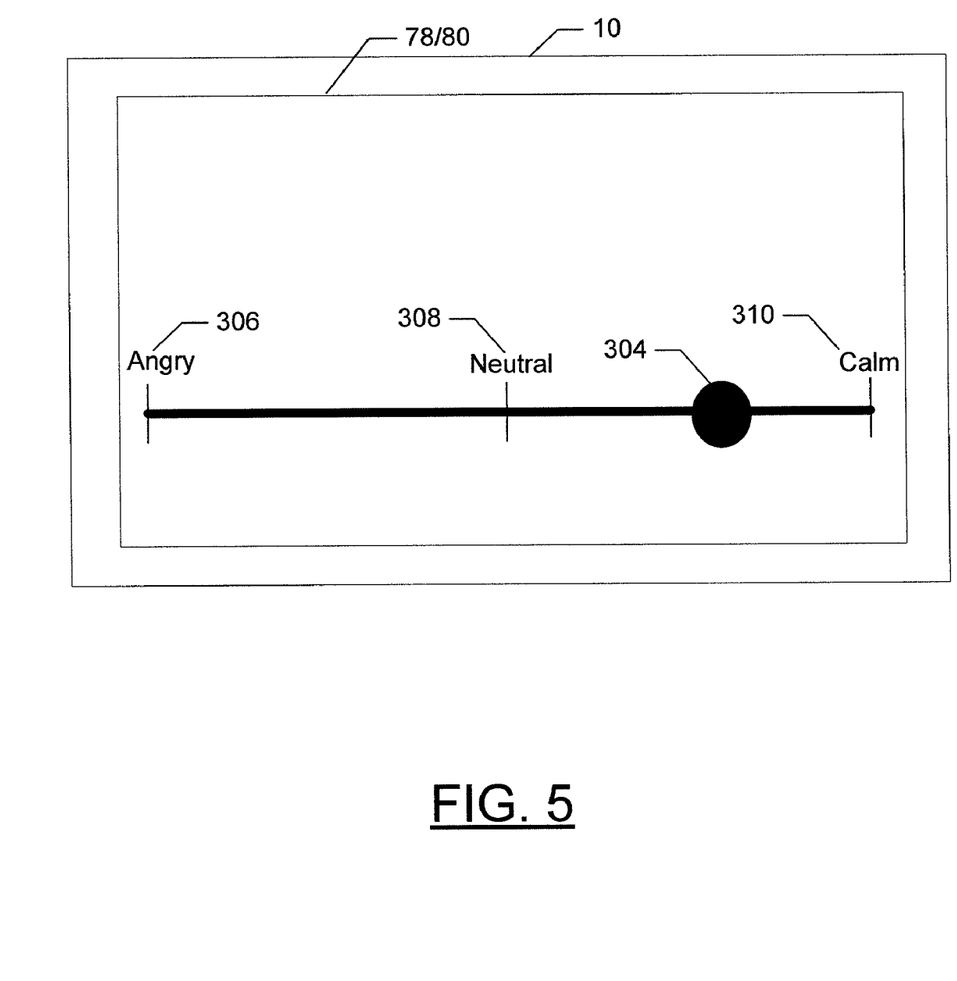
FIG. 5 illustrates the user terminal of FIG. 3 which is receiving a user mood indicator according to an example embodiment of the present invention.

Turning now to the option 106 of receiving a user mood indicator, FIG. 5 illustrates an embodiment of the user terminal 10 when the user terminal is configured to receive a user mood indicator. As illustrated, in some embodiments the user may move a sliding scale 304 between a plurality of positions between various moods, for example between angry 306, neutral 308, and calm 310 to receive the user mood indicator. In some embodiments the scale may be color-coded, such that when the user moves the sliding scale 304 to a red area, this corresponds with feeling angry, whereas moving the sliding scale to a blue area corresponds with feeling calm. Thus, the user may provide the user terminal 10 with a user mood indicator. However, various other ways of inputting the user mood indicator may be used, such as by selecting a mood from a list of moods.

Returning to FIG. 2, the apparatus 50 may additionally comprise a contextual characteristic determiner 86. The contextual characteristic determiner 86 may determine one or more contextual characteristics. Contextual characteristics may include the present time, location, activity, etc. The processor 70 may be embodied as, include or otherwise control the content characteristic determiner 86. Thus, for example, the contextual characteristic determiner 86 may determine that the user is presently at home, or outside walking. Information relating to the location of the user may, for example, be provided by a GPS module 88, though location information may additionally or alternatively be provided through other means such as triangulation using cell phone towers. Thus, the apparatus 50 may receive a content category selection and determine one or more contextual characteristics. As will be described below, this information may be used to select a content package.

Figure 6:
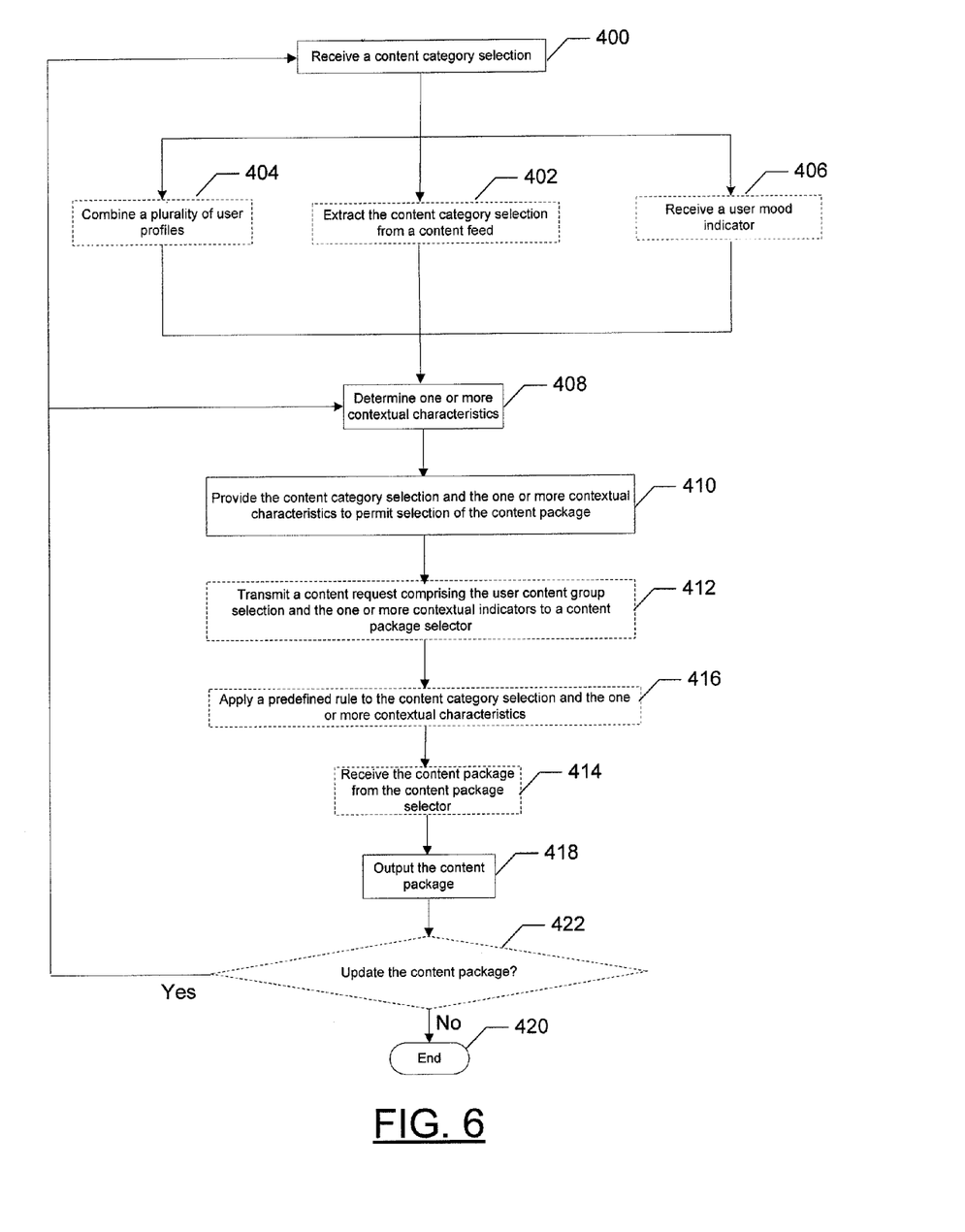
FIG. 6 illustrates a flowchart according to an example method providing for output of a content package in accordance with an example embodiment of the present invention.

In terms of methods associated with embodiments of the present invention, the above-described apparatus 50 or other embodiments of apparatuses may be employed. In this regard, FIG. 6 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by a computer program product including computer program instructions. In this regard, the computer program instructions which embody the procedures described above may be stored by a memory device and executed by a processor of an apparatus. As will be appreciated, any such computer program instructions may be loaded onto a computer or other programmable apparatus (for example, hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method comprises receiving a content category selection at operation 400. The operation 400 of receiving a content category selection may include various embodiments of operations which input selections used to determine the content which is displayed. For example, in some embodiments receiving the content category selection at operation 400 may comprise extracting the content category selection from a content feed, as illustrated at operation 402. Alternatively or additionally, the operation 400 of receiving the content category selection may comprise combining a plurality of user profiles at operation 404 and/or receiving a user mood indicator at operation 406. Thus, by receiving a content category selection at operation 400, the method may be able to determine the present interests of the user, and thereby tailor a content package to those interests, as will be described below.

However, in addition to receiving a content category selection at operation 400, the method further comprises determining one or more contextual characteristics at operation 408. Once the content category has been selected and one or more contextual characteristics have been determined, the method further comprises providing the content category selection and the one or more contextual characteristics to permit selection of a content package at operation 410. In some embodiments the actual selection the content package may be carried out externally from the device receiving the content category selection at operation 400 and determining the one or more contextual characteristics at operation 408. Accordingly, the method may further comprise providing for transmission of a content request, which may be in the form of an XML package, comprising the content category selection and the one or more contextual characteristics at operation 412, and thereafter receiving the content package from the content package selector at operation 414. Further, the operation 410 of providing the content category selection and the one or more contextual characteristics to permit selection of the content package may comprise applying a predefined rule to the content category selection and the one or more contextual characteristics at operation 416, which may occur between the operations 412, 414 of providing for transmission of the content request and receiving the content package. Thus a plurality of techniques may be employed in order to select the content package by using a predefined rule. A wide variety of predefined rules may be employed, and hence they will not be discussed in detail. However, by way of example, a predefined rule may apply to a content category selection comprising a user mood indicator which indicates that the user is angry and thereby choose content which is intended to calm the user down, such as by providing the user with news articles relating to good news.

Once the content package is selected, and before ending at block 420, the method further comprises providing for output of the content package at operation 418. As discussed above, outputting the content package may comprise displaying the content package. The particular user interface which is provided when outputting the content package may depend on the particular content package which is selected. For example, each content category may have a specific user interface associated therewith in some embodiments. In one example embodiment, the content package may comprise a plurality of URL links. In such embodiments the URL links may be provided in a list format. In other embodiments, for example, the content package may comprise weather information or sports scores. In such embodiments the content package may be displayed as graphics illustrating the weather forecast and the sports scores on the home screen. Further, in some embodiments the content package may comprise a video, which may be played on the home screen, and/or audio may be output. The particular manner in which the content package is outputted may in some embodiments be controlled by the device which outputs the content package, such as the user terminal 10. For example, in some embodiments the output of the content package may be selected by the user at the time the content category is selected, or through general settings associated with the user terminal 10 which may, for example, be stored as part of a user profile. However, in other embodiments the output characteristics may be controlled by a separate device, such as the content package selector 40 in embodiments in which the content package is selected by an external apparatus.

Thus, the user may be provided with a content package which may be relevant both in terms of the content category, because this was selected by the user and in terms of the contextual characteristics, because these were determined by the device(s) carrying out the method. In this regard, by receiving the content category selection, the content package may be more likely to be of interest to the user due to the user specifically being involved in the content selection process. In particular, this may be more likely to result in the selection of a content package which is of greater interest to a user than a method which merely relies on the user's profile information to determine a type of content to output. For example, a user's interests although generally remaining the same, may change over time, particularly with regard to specific items of interest. Thus a user profile may not necessarily be updated to reflect present interests of the user. Accordingly, asking for and receiving a content category selection may be advantageous.

Further, in order to ensure that the content category remains relevant to the user, the method may further comprise updating the content package based on a change to the content category selection or the one or more contextual characteristics at operation 422 such that the content package is dynamic. In some embodiments the method may return to both the operation 400 of receiving a content category selection and the operation 408 of determining one or more contextual characteristics. However, in other embodiments the method may only conduct one of the two operations 400, 408. For example, in some embodiments the method may update the content package by determining the one or more contextual characteristics at operation 408 continuously or at predefined intervals, whereas a new content category selection may not be received at operation 400 until the user chooses to make a new content category selection. However, various other embodiments may be possible. For instance, in some embodiments, the user may be instructed to make a content category selection at predefined intervals.

In an example embodiment, an apparatus for performing the method of FIG. 6 and other methods described above may comprise a processor (for example, the processor 70) configured to perform some or each of the operations (400-422) described above. The processor may, for example, be configured to perform the operations (400-422) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 400-422 may comprise, for example, the processor 70, the user interface 72 (including the display 78 and touch interface 80), the communication interface 74, the content category selector 82, the content category extractor 84, the contextual characteristic determiner 86, and the GPS module 88, and/or an algorithm executed by the processor for processing information as described above. However, the above-described portions of the apparatus 50 as they relate to the operations of the method illustrated in FIG. 6 are merely examples, and it should be understood that various other embodiments may be possible.

In some embodiments the operation 400 of receiving a content category selection may be conducted by means, such as the user interface 72 and the processor 70 in conjunction with the content category selector 82. Further, the operations of combining a plurality of user profiles at operation 404 and/or receiving a user mood indicator at operation 406 may also be conducted by means such as the processor 70 in conjunction with the content category selector 82. In embodiments of the method in which the operation 400 of receiving a content category selection comprises extracting the content category selection from a content feed at operation 402, this operation may be conducted by means, such as the processor 70 in conjunction with the content category extractor 84. Additionally, the operation 408 of determining one or more contextual characteristics may be conducted by means such as the processor 70 in conjunction with the contextual characteristic determiner 86. When the operation 408 of determining the contextual characteristics relates to location, the method may further employ means such as the GPS module 88.

Thereafter, the operation 410 of providing the content category selection and the one or more contextual characteristics to permit selection of a content package may be conducted by means such as the processor 70. However, in some embodiments the actual selection of the content category may be made by an external apparatus, for example by means such as the content package selector 40. Thus, in some embodiments the operation 416 of applying a predefined rule to the content category selection and the one or more contextual characteristics may also be carried out by means such as the content package selector 40. In this regard, in some embodiments the operation 410 of providing the content category selection and the one or more contextual characteristics may comprise providing for transmission of a content request at operation 412 and receiving the content package from the content package selector at operation 414, which may be conducted by means such as the processor 70 in conjunction with the communication interface 74.

With regard to providing for output of the content package at operation 418, this operation may be conducted by means such as the processor 70 in conjunction with the display 78. Finally, updating the content package based on a change to the content category selection or the one or more contextual characteristics at operation 422 may be conducted by means such as the processor 70 in conjunction with the respective pieces of hardware as described above for each of the respective operations (400-418).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising:
   at least one processor; and
   at least one memory including computer program code, the at least one memory and the computer program code configured to, with the processor, cause the apparatus to at least:
   receive a content category selection, wherein at least a portion of the content category selection is based on a combination of a plurality of user profiles that are combined based on a received indication of a weight for each user profile of the plurality of user profiles;
   determine one or more contextual characteristics;
   cause the content category selection and the one or more contextual characteristics to permit selection of a content package to be provided; and
   cause an output of the content package to be provided.

2. The apparatus of claim 1, wherein the at least one memory including the computer program code is further configured to, with the at least one processor, cause the apparatus to update the content package based on a change to the content category selection or the one or more contextual characteristics.

3. The apparatus of claim 1, wherein the at least one memory including the computer program code is further configured to, with the at least one processor, cause the apparatus to receive the content category selection by extracting the content category selection from a content feed that is provided by at least one social network.

4. The apparatus of claim 1, wherein the at least one memory including the computer program code is further configured to, with the at least one processor, cause the apparatus to cause the content category selection and the one or more contextual characteristics to be provided by:
   causing a transmission of a content request comprising the content category selection and the one or more contextual characteristics to a content package selector; and receiving the content package from the content package selector.

5. The apparatus of claim 1, wherein the at least one memory including the computer program code is further configured to, with the at least one processor, cause the apparatus to receive the content category selection by receiving an indication of a current user mood.

6. The apparatus of claim 1, wherein the at least one memory including the computer program code is further configured to, with the at least one processor, cause the apparatus to cause the content category selection and the one or more contextual characteristics to be provided by applying a predefined rule to the content category selection and the one or more contextual characteristics.

7. A method comprising:
receiving a content category selection, wherein at least a portion of the content category selection based on a combination of a plurality of user profiles that are combined based on a received indication of a weight for each user profile of the plurality of user profiles;
determining one or more contextual characteristics;
causing the content category selection and the one or more contextual characteristics to permit selection of a content package to be provided; and
causing an output of the content package to be provided.

8. The method of claim 7, further comprising causing the content package to be updated based on a change to the content category selection or the one or more contextual characteristics.

9. The method of claim 7, wherein receiving the content category selection comprises extracting the content category selection from a content feed that is provided by at least one social network.

10. The method of claim 7, wherein causing the content category selection and the one or more contextual characteristics to be provided comprises:
causing a transmission of a content request to be provided comprising the content category selection and the one or more contextual characteristics to a content package selector; and
receiving the content package from the content package selector.

11. The method of claim 7, wherein receiving the content category selection comprises an indication of a current user mood.

12. The method of claim 7, wherein causing the content category selection and the one or more contextual characteristics to be provided comprises applying a predefined rule to the content category selection and the one or more contextual characteristics.

13. A computer program product comprising at least one computer-readable non-transitory storage medium having computer-executable program code portions stored therein, the computer-executable program code portions comprising:
program code instructions for receiving a content category selection, wherein at least a portion of the content category selection is based on a combination of a plurality of user profiles that are combined based on a received indication of a weight for each user profile of the plurality of user profiles;
program code instructions for determining one or more contextual characteristics;
program code instructions for causing the content category selection and the one or more contextual characteristics to permit selection of a content package to be provided; and
program code instructions for causing an output of the content package to be provided.

14. The computer program product of claim 13, further comprising program code instructions for updating the content package based on a change to the content category selection or the one or more contextual characteristics.

15. The computer program product of claim 13, wherein program code instructions for receiving the content category selection comprise program code instructions for extracting the content category selection from a content feed that is provided by at least one social network.

16. The computer program product of claim 13, wherein program code instructions for causing the content category selection and the one or more contextual characteristics to be provided comprises:
program code instructions for causing a transmission of a content request to be provided comprising the content category selection and the one or more contextual characteristics to a content package selector; and
program code instructions for receiving the content package from the content package selector.

17. The computer program product of claim 13, wherein program code instructions for causing the content category selection and the one or more contextual characteristics to be provided comprises program code instructions for applying a predefined rule to the content category selection and the one or more contextual characteristics.

* * * * *